SELF-STEERING ANTENNA ARRAY SYSTEM

Filed Jan. 9, 1964

INVENTORS A. B. CRAWFORD
L. C. TILLOTSON
BY
ATTORNEY 3,334,346

SELF-STEERING ANTENNA ARRAY SYSTEM

Arthur B. Crawford, Fair Haven, and Le Roy C. Tillotson, Holmdel, N.J., assignors to Bell Telephone Laboratories, Incorporated, New York, N.Y., a corporation of New York Filed Jan. 9, 1964, Ser. No. 336,820
7 Claims. (Cl. 343—100)

This invention relates to self-steering antenna arrays, and more particularly, to circuit arrangements increasing the versatility of self-steering array systems.

A patent application of C. C. Cutler, R. Kompfner, and L. C. Tillotson, Ser. No. 162,165, filed Dec. 26, 1961, now Patent No. 3,273,151, and assigned to the assignee of this invention, discloses an antenna array system that transmits a directional beam of electromagnetic energy toward the source of a pilot signal impinging upon the array. The theory on which this self-steering array operates is that the phase with which each antenna element intercepts the incoming pilot signal represents information from which a phase angle for the signal to be transmitted from the antenna element can be produced by means of a series of filtering and mixing operations. This transmitting phase angle is suitable to cause constructive wave interference of the signal radiated from the antenna element with the signals radiated from the other antenna elements in the direction to the source of pilot signals. The disclosed system obviates phase shifters, phase detectors, voltage controlled oscillators, and interconnections between antenna elements of the array, which are required in prior art, self-steering array systems.

The above-mentioned patent application teaches that transmission can be carried on at a frequency different from reception. Involved are the steps of inverting the polarity of the phase angle of the portion of the pilot signal received by each antenna element, multiplying the frequency of this portion by a factor equal to the ratio of the transmitted frequency divided by the received pilot frequency and using the resulting signal as a steering signal for transmitting from the element. The steering signals have phase angles such that when they are mixed with signals to be transmitted and the resulting sidebands radiated from the elements of the array, directional transmission toward the source of the pilot signal takes place. It has been discovered, however, that this procedure is only applicable in the case of some array arrangements, notably planar arrays, because in the case of other array arrangements, notably spherical arrays, reception of a single pilot signal by the array elements is not productive of sufficient information to permit derivation of suitable steering signals for transmission at a frequency different from reception.

It is therefore an object of this invention to generate suitable steering signals for a self-steering array system of the type disclosed in the Cutler-Kompfner-Tillotson application under conditions in which transmission and reception take place at different frequencies, regardless of the arrangement of array elements.

In planar arrays, as well as spherical arrays, the system disclosed in the Cutler-Kompfner-Tillotson application experiences some difficulty in frequency multiplication, which is a necessary step in transmission at a frequency different from reception. If frequency multiplication by a nonintegral, i.e., a fractional, factor is to take place, this is accomplished by frequency multiplication by the numerator followed by frequency division by the denominator. Moreover, the process of frequency division may give rise to ambiguity in the phase of the steering signals. Frequency division by a factor of three, for example, could result in the steering signals of three antenna elements being 120 degrees out of phase with one another in addition to the differences in phase representing the steering information. Such a phase ambiguity is an intolerable condition because it seriously impairs self-steering performance. The problem can be avoided by employing the obvious expedient of designing the frequency plan of the system such that the frequency of the transmitted signal is a multiple of the frequency of the received pilot signal. In broadband, multiplex communication systems having complex frequency plans such a restriction on the relationship between the transmitted frequency and the received frequency would unduly complicate the design of the overall frequency plan of the system.

It is therefore another object of this invention to increase the freedom of choice as to the frequency of the received pilot signal and the signal to be transmitted in a self-steering array of the type disclosed in the Cutler-Kompfner-Tillotson application.

In accordance with these objects, a pair of pilot signals of different frequencies is transmitted to a self-steering array system of the type disclosed in the Cutler-Kompfner-Tillotson application, suitably modified to accommodate two pilot signals. Reception of two pilot signals is productive of sufficient information to permit generation of steering signals to control transmission at a frequency different from the pilots in any array arrangement, including a spherical one. Moreover, the use of two pilot signals also greatly expands the freedom of choice over the absolute frequency of the pilot signals and the signal to be transmitted. The frequency of the signal to be transmitted need only be a multiple of the difference in frequency between the two pilot signals. Thus, the absolute frequency of the two pilot signals is immaterial.

The two pilot signals received by each antenna element are mixed together and the difference frequency sideband is multiplied by the appropriate integral factor. In one embodiment, of general applicability, the product signal is beat with one of the pilot signals "per se" and one of the resulting sidebands is employed as a steering signal. In another embodiment, applicable only for some array arrangements, including planar ones, the product signal is employed directly as the steering signal.

These and other features of the invention will become more apparent from consideration of the following detailed description taken in conjunction with the drawing in which.

Figure 2:
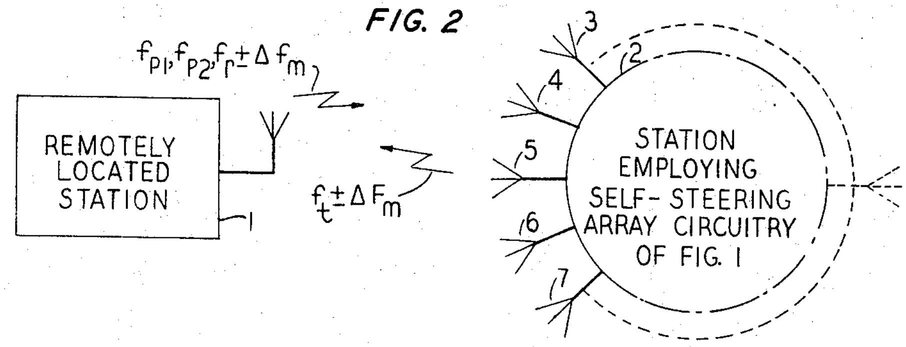
FIG. 2 is a diagram depicting two communication stations, one of which is a self-steering array, communicating with each other.

In FIG. 2 a remotely located station 1 is shown transmitting to a station 2 a pilot signal of frequency $f_{p1}$, a pilot signal of frequency $f_{p2}$, and an information signal of frequency $f_r \pm \Delta f_m$, where $f_r$ represents a carrier and $\Delta f_m$ represents a band of information modulated upon the carrier. Stations 1 and 2 are subject to changes in relative orientation. Station 2 employs a spherical self-steering array comprising, in part, antenna elements 3, 4, 5, 6, and 7. The phase angles of the portions of pilot signals $f_{p1}$ and $f_{p2}$ intercepted by each antenna element represent information from which a steering signal can be derived. This steering signal introduces to the signal radiated from the antenna element a phase angle such that it will combine constructively with the signals radiated from the other antenna elements in the direction to remotely located station 1. Thus, a directional beam of information of a frequency $f_t \pm \Delta F_m$, where $f_t$ represents a carrier and $\Delta F_m$ represents a band of information modulated upon the carrier, is transmitted from station 2 to station 1, regardless of the relative position of station 1 with respect to station 2.

Figure 3A:
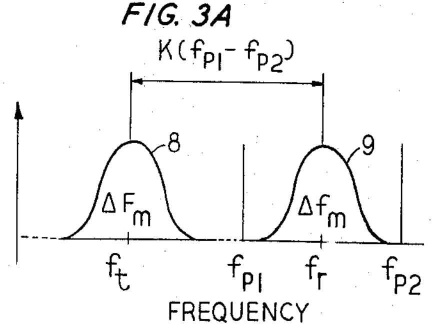
FIGS. 3A and 3B are graphs useful in explaining the mode of operation of the invention.

FIG. 3A illustrates a typical frequency plan on the frequency spectrum for the signals discussed above. Curves 8 and 9 represent the information transmitted from station 2, $\Delta F_m$, and the information transmitted from station 1, $\Delta f_m$, respectively. Pilot signals $f_{p1}$ and $f_{p2}$ are most conveniently placed on both sides of and near the band of information $\Delta f_m$.

As taught in the Cutler-Kompfner-Tillotson application, the relative phase angle required for a signal to be transmitted from each antenna element of the array toward remotely located station 1 is opposite in polarity and related in magnitude, as a function of frequency, to the phase angle of the portion of the pilot signal intercepted by the antenna element relative to the same reference. If transmission is to take place at the frequency of the received pilot signal, the suitable phase angle for transmission is equal and opposite to the phase angle of the received pilot signal.

Figure 3B:
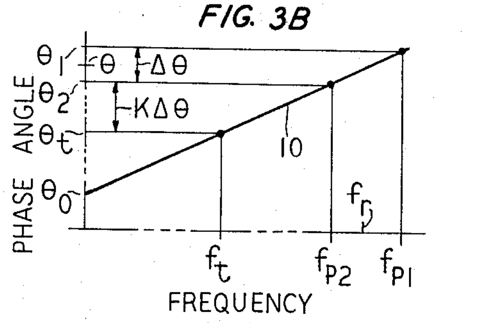

Pursuant to the present invention, it was determined that the relationship between the magnitude of phase angle and frequency of a typical antenna element can in the case of spherical arrays as well as others be represented by a curve such as a curve 10 in FIG. 3B for a given orientation of station 2 with respect to the impinging wave. The dashed portions of the coordinates of FIGS. 3A and 3B represent sections that are contracted in length as compared with the solid portions. For example, the distance between the two pilot signals might be 100 megacycles per second and the absolute frequency of the pilots might be about 5000 megacycles per second. As the direction of incidence of the wave impinging upon the antenna element changes, the slope of curve 10 also changes. Likewise, the slope of curve 10, generally, is different for each antenna element for any one direction of incidence. The point of intercept of curve 10 on the ordinate of FIG. 3B, designated $\theta_2$, also changes as a function of the orientation of station 2 with respect to the impinging wave. Pilot signal $f_{p1}$ is intercepted by the typical antenna element represented in FIG. 3B having a phase angle $\theta_2$ and pilot signal $f_{p2}$ is intercepted by this antenna element having a phase angle $\theta_2$. In order to transmit from the array a signal having a frequency $f_t$ in a directional beam toward remotely located station 1, the signal transmitted from the antenna element must have a phase angle whose magnitude is $\theta_t$. The difference in frequency between the two pilot signals is selected such that the product of this difference and an integral factor K is equal to the frequency difference between one of the pilot signals and the transmitted signal. Expressed algebraically, $$K=\frac{f_{p1}-f_t}{f_{p1}-f_{p2}} \quad (1)$$

Thus, the phase angle $\theta_t$ can be obtained by multiplying the difference frequency sideband resulting from mixing the two pilots, having a phase angle $\Delta\theta$, by the constant factor K, yielding a phase angle $K\Delta\theta$, and subtracting the product from pilot signal $f_{p2}$, having a phase angle $\theta_2$.

Figure 1:
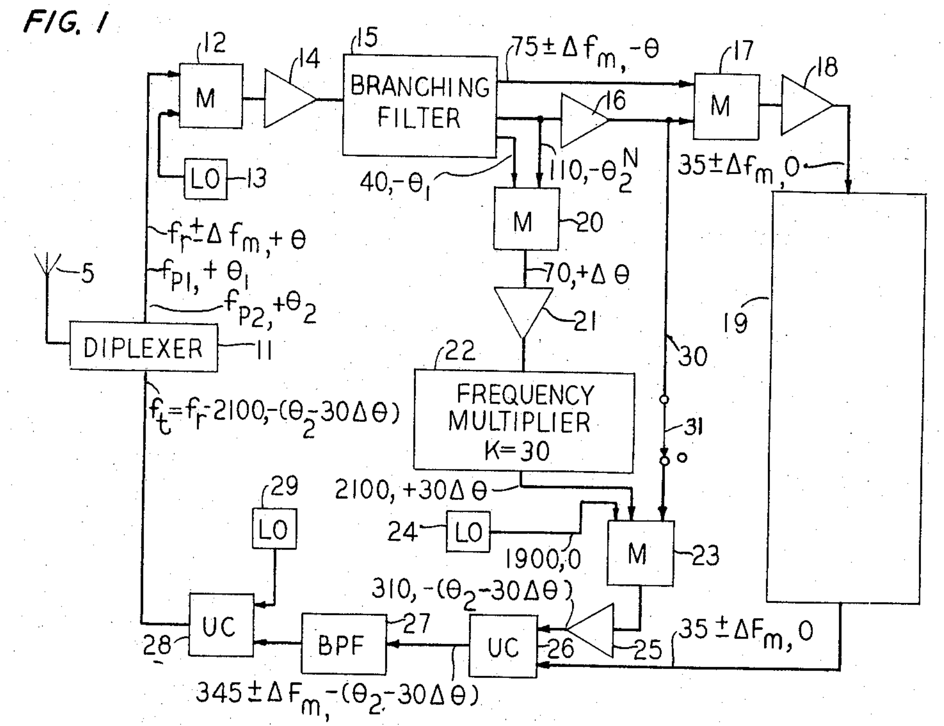
FIG. 1 is a block diagram in schematic form of circuitry associated with one antenna element of the array and arranged in accordance with the principles of the invention.

Reference is now made to FIG. 1, which discloses circuitry that is associated with one of the elements of the array and that derives a steering signal having the proper phase angle to contribute to directional transmission toward remotely located station 1. In FIG. 1 the frequency and phase angles associated with the signals at various points of the system are shown. The quantity before the comma in each case is the frequency of the signal and the quantity after the comma in each case is the phase angle associated with the signal. The electromagnetic wave from remotely located station 1 impinging upon the array is intercepted by each antenna element, antenna element 5 in FIG. 1 being exemplary of the remaining antenna elements, and is applied to a diplexer 11, which can be a wave guide hybrid as shown in FIG. 9.5–3 at page 339 of "Principles and Applications of Waveguide Transmission" by G. C. Southworth, D. Van Nostrand Company, Inc., 1950. This signal is composed of three components, a modulation component, a first pilot component, and a second pilot component, each of which can be expressed in the form: $A$ cosine $(2\pi tf+\theta)$ where A is the amplitude, $f$ is the frequency, $t$ is time, and $\theta$ is the phase angle of the component. Only the frequencies and phase angles of the signals now to be considered are important to comprehension of the mode of operation of the invention. Thus, all signals will be represented in the form $(2\pi tf+\theta)$ to simplify their expression. In this form the components of the signal intercepted by antenna element 5 are $$\begin{aligned} &\text{Modulation}=[2\pi t(f_r+\Delta f_m)]+[\theta+\theta_0] && (a) \\ &\text{First pilot}=[2\pi f_{p1}t]+[\theta_1+\theta_0] && (b)\ (2) \\ &\text{Second pilot}=[2\pi f_{p2}t]+[\theta_2+\theta_0] && (c) \end{aligned}$$

The three components represented in Equation 2 are beat in a mixer 12 with the output of a local oscillator 13 and the difference frequency sidebands resulting, represented by $$\begin{aligned} &\text{Modulation}=[2\pi t(f_{LO}-f_r-\Delta f_m)]-[\theta+\theta_0] && (a) \\ &\text{First pilot}=[2\pi t(f_{LO}-f_{p1})]-[\theta_1+\theta_0] && (b)\ (3) \\ &\text{Second pilot}=[2\pi t(f_{LO}-f_{p2})]-[\theta_2+\theta_0] && (c) \end{aligned}$$

where $f_{LO}$ is the frequency of local oscillator 13, are amplified and separated from the remaining modulation products by a narrow band amplifier 14.

In order to point up clearly the advantages of the system, specific frequencies of operation will be assumed for the remainder of the explanation. A branching filter 15 separates the modulation component assumed to have an intermediate frequency carrier frequency of 75 megacycles per second, the first pilot component assumed to have a frequency of 40 megacycles per second, and the second pilot component assumed to have a frequency of 110 megacycles per second. It is also assumed that it is desired to transmit at a frequency that is 2100 megacycles lower than the frequency of the received signal, i.e., $f_t=f_r-2100$. It should be noted that beating in mixer 12 reverses or inverts the polarity of the phase angles of the components originally intercepted by antenna element 5 and causes the original pilot component higher in frequency $f_{p1}$ to become lower in frequency, 40 megacycles per second.

The second pilot component, after amplification in an amplifier 16 is beat with the modulation component in a mixer 17. As taught in the Cutler-Kompfner-Tillotson application, the difference-frequency modulation component resulting from this beating operation is approximately in phase with all the other parallel components derived by the other antenna elements, and thus can be combined additively therewith. To this end the output of mixer 17 having a carrier frequency of 35 megacycles per second is applied to a narrow band amplifier 18, which separates and amplifies the difference-frequency modulation component described for application in a block 19 to utilization means, which can be a terminal receiver or a transmitting channel. Alternatively, the first pilot component could be used instead of the second pilot component to be beat with the modulation component in mixer 17.

The pilot components are beat together in a mixer 20 and the difference-frequency sideband having a frequency of 70 megacycles per second, represented by $$2\pi t(f_{p2}-f_{p1})+\Delta\theta \quad (4)$$

is amplified and separated by a narrow band amplifier 21. This signal, having associated with it a phase angle $\Delta\theta=\theta_1-\theta_2$, is multiplied by the integral factor 30, which value is determined by Equation 1, in a frequency multiplier 22 that does not require any stages of frequency division. The product signal generated by frequency multiplier 22 having a frequency of 2100 megacycles per second is beat with the second pilot signal applied by a lead 30 through switch 31 and the output of a local oscillator 24 in a third order mixer 23. Since the difference in frequency between $f_{p1}$ and $f_{p2}$ is small relative to the difference in frequency between $f_{p2}$ and $f_t$, the first pilot component can be in some situations substituted for the second pilot component as an input to mixer 23. One of the resulting sidebands having a frequency of 310 megacycles per second, $$[2\pi t(Kf_{p2}-Kf_{p1}+f_{LO}-f_{p2})]-[\theta_2-K\Delta\theta] \quad (5)$$

has associated with it a phase angle equal in magnitude to $\theta_t$ and opposite in polarity to the phase angle of the received wave. This sideband is amplified and separated by an amplifier 25 and is used as a steering signal to permit directional transmission toward source 1 of information modulated on a carrier frequency of 35 megacycles per second from a source in block 19.

The steering signal is applied to an up-converter 26 where it is beat with the output of block 19. In this case, the resultant sum-frequency sideband having a frequency of 345 megacycles per second is utilized in order to preserve the opposite polarity of the steering signal. The output of up-converter 26 is separated by a bandpass filter 27 and applied to an up-converter 28 together with the output of a local oscillator 29 for final conversion to the frequency of transmission $f_t$ and amplification. Thereafter the signal is applied through diplexer 11 to antenna 5 for transmission to remotely located station 1.

Channels identical to that shown in FIG. 1 are provided for all the remaining antenna elements of the array. These channels are all supplied beating signals from the same local oscillators 13, 24, and 29 so that the phase angles introduced by the local oscillator signals are the same for each antenna branch and thus can be disregarded.

Modification of the arrangement shown in FIG. 1 by opening switch 31 in lead 30 results in an operative system when the array is planar because, in that case, curve 10 of FIG. 3B intercepts the ordinate at the origin—in other words there is no orientation phase angle $\theta_0$. It can be seen from FIG. 3B that if curve 10 intercepts the ordinate at the origin, the transmitting phase angle $\theta_t$ can be derived directly by multiplying a single received pilot signal by a factor equal to the ratio of the frequency of transmission divided by the frequency of the received pilot. This principle is disclosed in the Cutler-Kompfner-Tillotson application. However, in the case of a planar array use of two pilot signals as shown in the modified arrangement of FIG. 1 permits of frequency multiplication by an integral factor over a wider range of pilot frequencies. Here, the integral factor is $$K=\frac{ft}{f_{p1}-f_{p2}} \quad (6)$$

so that if transmission is to take place at 4200 megacycles per second, the integral factor $k=60$. In this modification the frequency of the output of oscillator 24 is larger than that of the output of frequency multiplier 22 so the phase angle of the difference-frequency sideband of the output of mixer 23 is of opposite polarity.

The principles of this invention may be employed in the various arrangements disclosed in the above-mentioned Cutler-Kompfner-Tillotson application, in an application of L. H. Enloe, Ser. No. 220,010, filed Aug. 28, 1962, now Patent No. 3,175,216, and in an application of J. C. Schelleng and L. C. Tillotson, Ser. No. 234,382, field Oct. 31, 1962, now Patent No. 3,166,749. For example, block 19 could be another transmitter and receiver identical to the circuitry shown in FIG. 1, in which case the system would operate as a two-way repeater. There may also be applications in which it is not desired to transmit modulation to the remotely located station. In this case, the steering signal "per se" appearing at the output of amplifier 25 can be applied directly to the antenna element after translation to frequency $f_t$. Although utilization of the same antenna array for both transmission and reception eliminates necessity for duplication of arrays for transmission and reception, principles of this invention are also applicable in the case in which separate arrays are employed for transmission and reception.

What is claimed is:

1. In a communication system, a first station having an array of antenna elements, a second station radiating two pilot signals toward said array, and apparatus individual to each antenna element comprising means for mixing the two pilot signals received by said element, means including a frequency multiplier for deriving from the difference-frequency component resulting from said mixing means a signal for transmission, said signal being of such phase that upon radiation from said antenna element it constructively combines with signals for transmission associated with the other antenna elements in the direction to said second station, and means for applying said signal for transmission to said antenna element for radiation therefrom.

2. In a communication system, a first station having an array of antenna elements, a second station radiating two pilot signals toward said array, a source of information-bearing signals to be transmitted from said array toward said second station, and apparatus individual to each antenna element comprising means for beating together the two pilot signals received by said element, means including a frequency multiplier for deriving from the difference-frequency sideband component resulting from said beating means a steering signal, said steering signal being of such phase that when beat with the output of said source of information-bearing signals a modulation component results that upon radiation from said antenna element constructively combines with modulation components associated with the other antenna elements in the direction to said second station, means for beating said steering signal with the output of said source of information-bearing signals, and means for applying said modulation component to said antenna element for radiation therefrom.

3. In a communication system, a first station having an array of antenna elements, a second station radiating two pilot signals toward said array, and apparatus individual to each antenna element comprising means for mixing the two pilot signals received by said element, means including a frequency multiplier for deriving from the difference-frequency component resulting from said mixing means a signal of such phase that upon radiation from said antenna element it constructively combines with similar signals associated with the other antenna elements in the direction to said second station, said frequency multiplier multiplying by an integral factor, and means for applying said signal to said antenna element for radiation therefrom.

4. In a communication system, a first station having an array of antenna elements, a second station radiating two pilot signals toward said array, a source of information-bearing signals to be transmitted from said array toward said second station, and apparatus individual to each antenna element comprising means for mixing the two pilot signals received by said element, means including a frequency multiplier for deriving from the difference frequency component resulting from said mixing means a steering signal, said steering signal being of such phase that when mixed with the output of said source of information-bearing signals a modulation component results that upon radiation from said antenna element constructively combines with modulation components associated with the other antenna elements in the direction to said second station, said frequency multiplier multiplying by an integral factor, means for mixing said steering signal with the output of said source of information-bearing signals, and means for applying said modulation component to said antenna element for radiation therefrom.

5. A communication system comprising a first station radiating two pilot signals, a second station having an array of antenna elements and a source of information to be transmitted to said first station, and circuitry associated with each of said antenna elements of said array comprising means for mixing the two pilot signals received by said antenna element, means for multiplying the frequency of the difference-frequency sideband resulting from said first mixing means by an integral factor, second means for mixing the product resulting from said multiplying means and one of the pilot signals received by said antenna element, third means for mixing the difference-frequency sideband from said second mixing means with the output of said source of information, means for preparing the sum-frequency sideband from said third mixing means for transmission to said first station, and means for applying said prepared signal to said antenna element, the integral factor of said multiplying means being equal to the difference in frequency between one of said pilot signals and said prepared signal divided by the difference in frequency between said pilot signals.

6. A communication system comprising a first station radiating two pilot signals, a second station having a planar array of antenna elements and a source of information to be transmitted to said first station, and circuitry associated with each of said antenna elements of said array comprising first means for mixing the two pilot signals received by said antenna element, means for multiplying the frequency of the difference-frequency sideband resulting from said first mixing means by an integral factor, a local oscillator the output of which is higher in frequency than the product resulting from said multiplying means, second means for mixing said product with the output of said local oscillator, third means for mixing the difference-frequency sideband resulting from said second mixing means with the output of said source of information, means for preparing the sum-frequency sideband from said third mixing means for transmission to said first station, and means for applying said prepared signal to said antenna element, the integral factor of said multiplying means being equal to the frequency of said prepared signal divided by the difference in frequency between said pilot signals.

7. A communication system comprising a first station radiating two pilot signals and an information-bearing signal, a second station having an array of antenna elements and a source of information to be transmitted to said first station, circuitry associated with each of said antenna elements of said array comprising a first local oscillator, first means for mixing the composite signal received by said antenna element from said first station with the output of said local oscillator, means for separating the difference-frequency components resulting from said first mixing means, second means for mixing one of the pilot components with the information-bearing component resulting from said first mixing means, a utilization circuit, means for applying the difference-frequency component resulting from said second mixing means to said utilization circuit, third means for mixing the two pilot components resulting from said first mixing means, means for multiplying in frequency the difference-frequency component resulting from said third mixing means by an integral factor, fourth means for mixing the product resulting from said frequency multiplying means and one of the pilot components resulting from said first mixing means, fifth means for mixing the difference-frequency component from said fourth mixing means with the output of said source of information, means for preparing the sum-frequency component resulting from said fifth mixing means for transmission to said first station, and means for applying said prepared signal to said antenna element.

References Cited

UNITED STATES PATENTS 3,166,749 1/1965 Schelleng et al. ------ 343—100

RODNEY B. BENNETT, *Primary Examiner.*

CHESTER L. JUSTUS, *Examiner.*

R. E. BERGER, *Assistant Examiner.*